United States Patent [19]
Ishikawa et al.

[11] 3,753,820
[45] Aug. 21, 1973

[54] METHOD AND APPARATUS OF FRICTION WELDING TWO ROTATING BODIES IN A PREDETERMINED RELATIVE ROTATIONAL RELATION

[75] Inventors: Yuji Ishikawa, Nagoya; Mitsuhiro Numata, Anjo, both of Japan

[73] Assignee: Mitsubishi Jidosha Kogyo Kabushiki Kaisha, Tokyo, Japan

[22] Filed: May 18, 1971

[21] Appl. No.: 144,598

[30] Foreign Application Priority Data
May 27, 1970 Japan.............................. 45/44846

[52] U.S. Cl........................ 156/73, 156/580, 228/2
[51] Int. Cl....................... B29c 27/08, B32k 27/00
[58] Field of Search............................ 156/73, 380; 29/470.3; 228/2

[56] References Cited
UNITED STATES PATENTS

| | | | |
|---|---|---|---|
| 3,609,854 | 10/1971 | Hasui | 156/73 |
| 3,542,274 | 11/1970 | Miller | 156/73 |
| 3,541,669 | 11/1970 | Yocum | 156/73 |
| 3,548,487 | 12/1970 | Stamm | 156/73 |
| 3,623,213 | 11/1971 | Sciaky et al. | 156/73 |
| 3,623,214 | 11/1971 | Sciaky et al. | 156/73 |

Primary Examiner—Douglas J. Drummond
Attorney—Wenderoth, Lind & Ponack

[57] ABSTRACT

The invention is a method of and apparatus for rotational position-setting friction welding, in which two bodies to be welded together are pressed together and the one member is rotated relative to the other member to generate heat by friction. The rate of relative rotation of the two bodies is then reduced to a predetermined value and when this predetermined value is reached the two bodies are brought into a predetermined relative rotational relationship and welded together.

12 Claims, 8 Drawing Figures

METHOD AND APPARATUS OF FRICTION WELDING TWO ROTATING BODIES IN A PREDETERMINED RELATIVE ROTATIONAL RELATION

This invention relates to a method of friction welding and to apparatus suitable for use in the method of friction welding according to the invention.

In a phase-setting method of friction welding known to the Applicants, the rate of relative rotation of two metallic bodies which are to be welded and which are pressed against each other and rotated relative to each other, is reduced to zero, and then one of the bodies is rotated to bring the bodies into a predetermined phase relationship, before the bodies are welded together. Therefore, there arises the disadvantage that the time required for completing the entire welding operation is prolonged by the time required for braking the rotating bodies to bring them to a halt and the time required for driving only one of them subsequently. In addition, when a tubular body is to be welded to another tubular body or to a rod body, the edge of the tubular body to be welded tends to be deformed by the torsional stress imparted thereto by the other body during the rotation of the other body to assume the predetermined phase relationship between the bodies. Hence it is practically impossible to obtain a precise weld by this method. Therefore, friction welding has been applicable only within a limited scope. Furthermore, one of the two bodies to be welded is almost held stationary throughout the welding step and, therefore, it is impossible to remove the "burr" which is formed at the welded portions of the bodies during the welding step. It has been necessary heretofore to remove the burr after completion of the welding step, which has rendered the welding operation inefficient and added to the cost of the welded product.

According to the present invention, there is provided a method of rotational position-setting friction welding in which two bodies to be welded together are pressed together, the one member is rotated relative to the other member to generate heat by friction, the rate of relative rotation of the two bodies is reduced to a predetermined value and when this predetermined value is reached the two bodies are brought into a predetermined relative rotational relationship and welded together.

In one embodiment of the method of the invention, the bodies to be welded are relatively rotated while being pressed against each other and welded together by the heat of friction generated at the contacting portions thereof, the rate of relative rotation of the two bodies is reduced by bringing the rate of rotation of one of said bodies close to the rate of rotation of the other one, the bodies are brought into a predetermined relative rotational relationship according to a signal indicative of the fact that the rate of relative rotation of the bodies has reached a predetermined value, and thereafter the welding is effected. The rate of relative rotation of two bodies to be welded is reduced to a predetermined value and the two bodies are placed in predetermined relative rotational relationship in response to a signal which is indicative of the fact that the rate of relative rotation has reached the predetermined value. Therefore, the time required for setting the relative rotational positions of the two bodies can be markedly shortened as compared with the method known to the Applicants which is discussed above, in which the relative rotation of the two bodies is once stopped and then one of the bodies is rotated to bring the bodies into the predetermined relative rotational relationship. Furthermore, no torsional force is created between the two bodies when bringing them into the predetermined relative rotational relationship, and therefore, the two bodies are not subjected to deformation at the portions thereof to be welded together. Consequently, it is possible to carry out rotational position-setting friction welding according to the invention quickly and positively, and hence to expand the scope of application of friction welding and to reduce the production costs of various machine parts.

In one embodiment of the method of the invention, after bringing the said bodies into the predetermined relative rotational relationship in response to a signal indicative of the face that the rate of relative rotation of the bodies has reached the predetermined value, the bodies are rotated together integrally by stopping the relative rotation of the bodies and the burr formed at the welded portions of the bodies is trimmed. Thus the burr can be trimmed during the welding operation.

This invention also provides apparatus for friction welding which comprises:

1. means for bringing the two bodies to be welded into engagement with each other under pressure, comprising two rotary members, each adapted to hold one of the said bodies, which rotary members are capable of being urged one toward the other;
2. means for rotating one of the said rotary members;
3. means for placing the two bodies in a predetermined relative rotational relationship which comprises two lay shafts, one lay shaft operatively connected to one of the said rotary members and the other lay shaft operatively connected to the other rotary member, and a constant position clutch through which the lay shafts can be interconnected; and
4. means for detecting the rate of relative rotation of the two lay shafts.

The invention will be further illustrated with reference to the accompanying drawings showing, by way of example, one embodiment of an apparatus according to the invention, in which.

Figure 1:
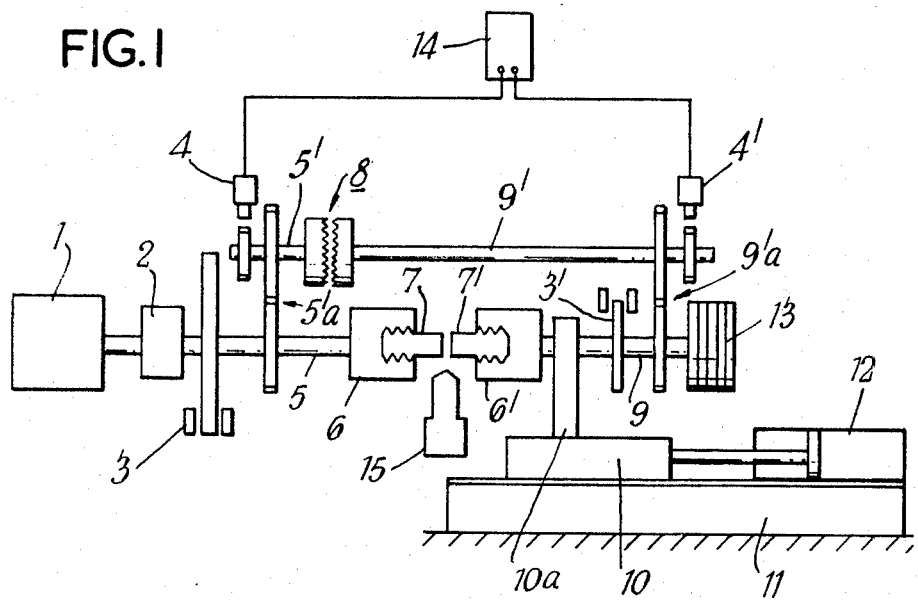
FIG. 1 is a schematic view of a friction welding apparatus according to the present invention.

Referring to FIG. 1, a motor 1 is connected to drive a driving shaft 5. The motor 1 is a variable pole motor which is variable between 2 poles and 6 poles, so as to be capable of rotating the driving shaft 5 at two different speeds, a high speed and a low speed. Alternatively, a unipolar motor may be used for the motor 1 and in this case the rate of rotation of the driving shaft 5 is varied through the suitable transmission mechanism. A clutch 2 is interposed between the motor 1 and one end of the driving shaft 5, and brake means 3 is provided adjacent said one end of the driving shaft 5. The clutch 2 is engaged and disengaged in association with the operation of the brake means 3; the clutch 2 and the brake means 3 are operatively connected with each other through a suitable connecting mechanism (not shown) so that when the brake means 3 is actuated, the clutch 2 is disengaged and the power transmission from the motor 1 to the driving shaft 5 is interrupted to stop the rotation of the driving shaft 5, while when the brake means 3 is placed in a non-braking position, the clutch 2 is engaged and the driving shaft 5 is driven. The driving shaft 5 is rotatably supported by a suitable machine frame (not shown). A driven shaft 9 is rotatably supported by a bracket 10a, with its axis in alignment with the axis of the driving shaft 5. The bracket 10a is mounted on a slide member 10 which slides in a horizontal direction on a slide bed 11 upon actuation of a hydraulic cylinder 12. The slide bed 11 is horizontally mounted on a base. Brake means 3' is provided at a suitable location of the driven shaft 9 to maintain the driven shaft 9 in a non-rotating state. A chuck 6' is secured to one end of the driven shaft 9 opposite to a chuck 6 secured to the driving shaft 5, the axes of the chucks 6 and 6' being in alignment. When the driven shaft 9 is displaced to the left by the operation of the hydraulic cylinder 12, bodies 7 an 7', which are to be welded together and which are mounted in the chucks 6 and 6' respectively, are brought into abutting engagement with each other under a pressure corresponding to the amount of operation of the hydraulic cylinder 12. When the driving shaft 5 is driven by the motor 1 under such condition, with the driven shaft 9 being braked by the brake means 3', a relative rotation occurs between the bodies and heat is generated by friction at the abutting portions of the bodies. When the brake means 3' is placed in a non-braking state, the driven shaft 9 is rotated incident to the rotation of the driving shaft 5 due to the frictional force created between the bodies 7 and 7' and the rate of rotation thereof gradually approaches the rate of rotation of the driving shaft 5, and finally the driven shaft 9 rotates integrally with the driving shaft 5. A flywheel 13 is mounted on the other end of the driven shaft 9. The flywheel is composed of a plurality of discs, so that the weight thereof can be adjusted by increasing or decreasing the number of the discs. The rotational moment of the driven shaft 9 is adjusted by adjusting the weight of the flywheel. The driving shaft 5 and the chuck 6, and the driven shaft 9 and the chuck 6', respectively constitute two rotary members, and these rotary members and the above-mentioned members associated therewith constitute means for pressing the bodies to be welded against each other. A lay shaft 5' is supported by the machine frame in parallel relation to the driving shaft 5 and is driven from the driving shaft 5 through gearing 5'a. A lay shaft 9' for the driven shaft is similarly supported by the machine frame in parallel relation to the driven shaft 9 and is operatively connected with the driven shaft 9' through gearing 9'a. The lay shafts 5' and 9' are axially aligned with each other, and the gearings 5'a and 9'a are of the same gear ratio. A one position electromagnetic clutch 8 is provided between the opposed ends of the lay shafts 5' and 9', and the driving member and the driven member of the clutch 8 are respectively provided with toothed surfaces engageable with each other. The teeth provided on the driving and driven members of the clutch are such that the members are engageable only in one relative rotational position; i.e. when the members of the clutch 8 are moved towards each other to engage each other, they will engage each other only in one predetermined relative position during their sliding movement through 360°. The lay shafts 5' and 9' and the one position electromagnetic clutch 8 constitute phase setting means. There are provided pickups 4 and 4' for observing the rates of rotation of the lay shafts 5' and 9' respectively and these pickups are electrically connected to a differential rotational speed meter 14. The arrangement is such that when the rate of relative rotation of the lay shafts 5' and 9' has reached a predetermined value, e.g. 100 r.p.m., a signal indicative of this fact is given to the one position electromagnetic clutch 8 from the differential rotational speed meter 14, to actuate the clutch 8. The pickups 4 and 4' and the differential rotational speed meter 14 constitute rate of relative rotation detecting means. When the rate of relative rotation of the lay shaft 5', driven from the driving shaft 5 through the gearing 5'a, and the lay shaft 9' reaches a predetermined value, this is detected by the rate of relative rotation detecting means mentioned above. When the rate of relative rotation reaches the predetermined value, the electromagnetic clutch 8 is actuated, the members move rotationally relative to each other during further relative rotational movement of the shafts 5 and 9 until they are engaged in the predetermined position, in response to a signal from the rate of relative rotation detecting means, so that the lay shafts 5' and 9' rotate integrally and the driving shaft 5 and the driven shaft 9 also rotate at the same rate. Therefore, by mounting the bodies 7 and 7' to be welded in the respective chucks 6 and 6' in such a manner that the predetermined relative rotational positions of said bodies are provided when the electromagnetic clutch 8 is in the predetermined engaging position, it is possible to place the bodies 7 and 7' in the predetermined relative rotational positions concurrently when said electromagnetic clutch 8 is brought into its engaged position. A burr trimming means 15 is mounted on the machine frame in such a manner as to be movable laterally and transversely between the chucks 6 and 6', and is adapted to trim the burr formed at the welded portions of the bodies 7, 7'. The lateral and transverse movements of the burr trimming means are effected by a suitable mechanism (not shown).

Figure 2:
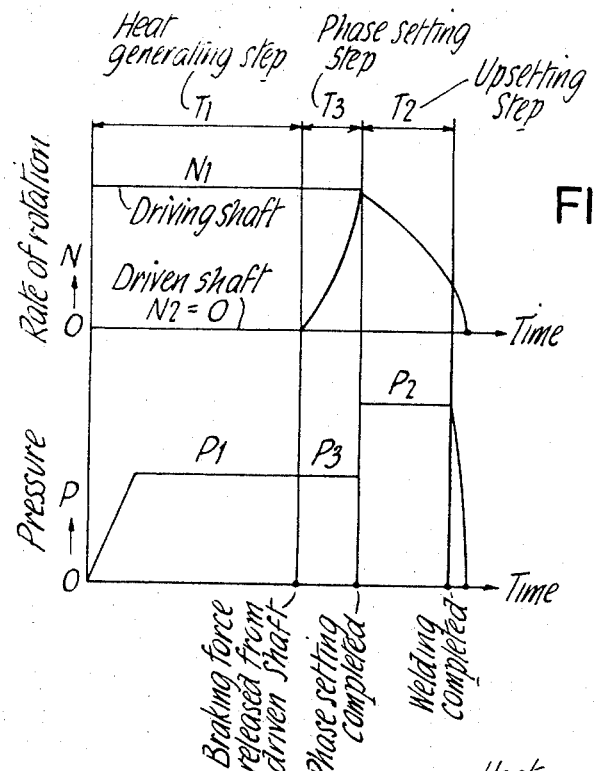
FIGS. 2 and 3 are process charts of one embodiment of the invention respectively.

Now, the mode of operation of the apparatus described above will be explained with reference to the process chart shown in FIG. 2. In carrying out the rotational position-setting friction welding of the bodies 7 and 7' by the apparatus of FIG. 1, the bodies 7 and 7' are mounted in the chucks 6 and 6' in such a manner that they will be in a predetermined relative rotational relation when the electromagnetic clutcn 8 is placed in a predetermined engaged position. Then, the electromagnetic clutch 8 is released and the brake means 3' is actuated to hold the driven shaft 9 against rotation (i.e. the rate of rotation $N_2 = 0$). The weight of the flywheel 13 is adjusted to set the time $T_3$ required for the rotational position setting step shown in FIG. 2. Thereafter, the motor 1 is set in motion to rotate the driving shaft 5 at a rate of rotation $N_1$, thereby causing relative rotation of the shafts 5 and 9. The driven shaft 9 is moved to the left by the hydraulic cylinder 12, so that the bodies 7 and 7' are brought into engagement with each other with a pressure $P_1$ and frictional heat is generated at the contacting portions of said bodies (the heat generating step in FIG. 2). The contacting portions of the bodies 7 and 7' are heated and plasticized in a time $T_1$ (when the heat generating step is completed). Upon lapse of the time $T_1$, the brake means 3' is released to allow the driven shaft 9 to rotate. The driven shaft 9 is rotated by the driving shaft by virtue of the friction between the bodies 7 and 7' and the rate of rotation thereof gradually approaches the rate of rotation $N_1$ of the driving shaft 5. Thus, the rate of relative rotation of the shafts 5 and 9 is reduced and finally, the shafts 5 and 9 rotate integrally at the same rate. The lay shaft 5' is being rotated at the rate $N_1$ by the driving shaft 5 and the lay shaft 9' is also rotated by the driven shaft 9 through the gearing 9'a, incident to rotation of the latter, although it is held stationary ($N'_2 = 0$) when the driving shaft 5 is held stationary. Therefore, the rate of relative rotation of the lay shafts 5' and 9' also decreases gradually. When the rate of relative rotation of the lay shafts 5' and 9' ($N'_1 - N'_2$) has reached a predetermined value, e.g., 100 r.p.m., this is detected by the rate of relative rotation detecting means comprising the rate of relative rotation detecting pickups 4 and 4' and the differential rotational speed meter 14, and a signal indicative of the fact is given to the electromagnetic clutch 8. The electromagnetic clutch 8 is actuated and the driving and driven members thereof engage each other during their sliding rotation through an angle of 360°, so that the lay shafts 5' and 9' rotate integrally (at the rate $N'_1$) and the driving shaft 5 and the driven shaft 9 also rotate integrally (at the rate of $N_1$). The bodies 7 and 7' which are previously set in the predetermined relative rotational relation, rotate integrally at the rate $N_1$ while being held in said predetermined relative rotational relation and being pressed against each other with a pressure $P_3$ ($P_3 = P_1$ in this case), and thus the rotational position setting step is completed. The time required for the setting step is $T_3$. When the above-described rotational position setting step has been completed, a pressure $P_2$, which is larger than the pressure $P_3$, is applied to the body 7' by the hydraulic cylinder 12 to carry out an upsetting step (the time required for the upsetting step being $T_2$). Then, the brake means 3 is actuated to disengage the clutch 2 and thereby to stop the rotation of the driving shaft 5, the driving shaft 9 and the lay shafts 5' and 9'. By the completion of the upsetting step, all steps of the friction welding (welding cycle) are ended.

Figure 3:
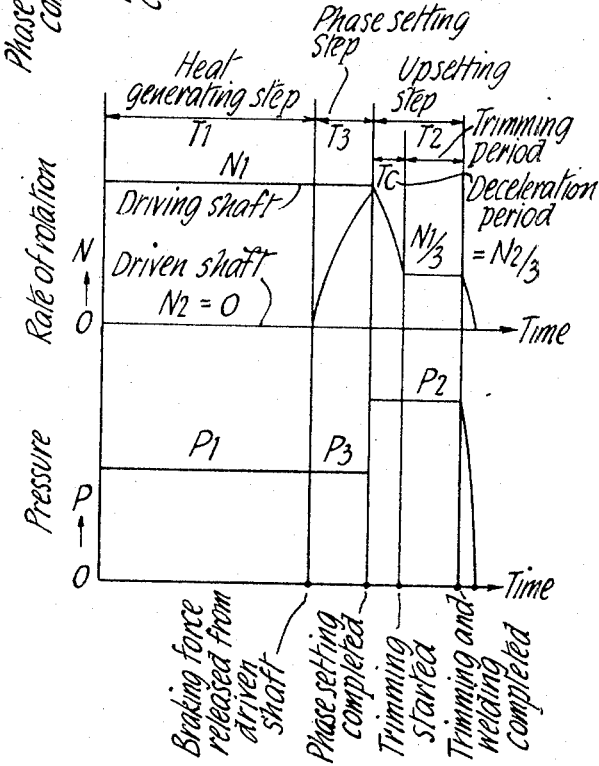

The mode of operation in which a burr trimming operation is carried out concurrently with the friction welding by the apparatus shown, will be explained next with reference to the process chart of FIG. 3. In this case, the operations of the respective elements up to the rotational position setting step are the same as in the preceding case. As may be understood from FIG. 3, the upsetting step is commenced concurrently with the completion of the rotational position step, by applying the pressure $P_2$, larger than $P_3$, the body 7' by means of the hydraulic cylinder 12, and at the same time the operation of the motor 1 is shifted from the 2-pole operation to the 6-pole operation, whereby the rate of rotation of the driving shaft 5 and the driven shaft 9 is reduced to $N_{1/3}$, which is suitable for the burr trimming operation. The time required for reducing the rate of rotation of the driving shaft 5 and the driven shaft 9 is $T_c$ which is set to be shorter than the time $T_2$ for the upsetting step. After reducing the rotational speed of the shafts 5 and 9, the trimming means 15 is set in operation during the time $|T_2 - T_1|$, to trim the burr formed at the welded portions of the bodies 7 and 7'. Thereafter, the brake means 3 is actuated to disengage the clutch 2 and thereby to stop the rotation of the driving shaft 5, the driven shaft 9 and the lay shafts 5' and 9'. By this step, the upsetting step is completed and hence all steps of the friction welding (welding cycle) are completed.

Figure 5:
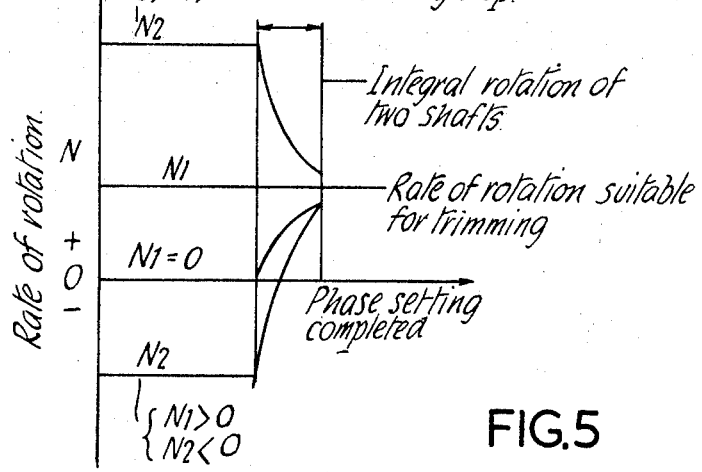
FIGS. 4 and 5 are partial process charts of another embodiment of the invention respectively.
Figure 4A:
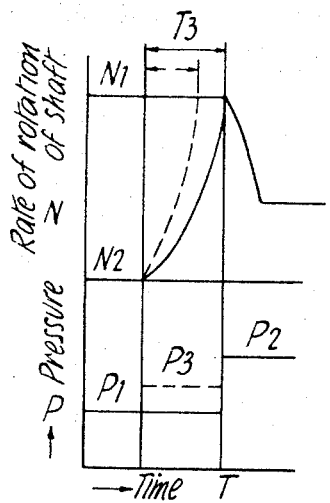
Figure 4B:
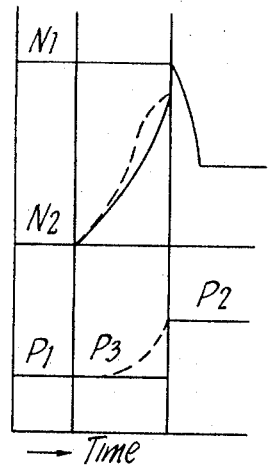
Figure 4C:
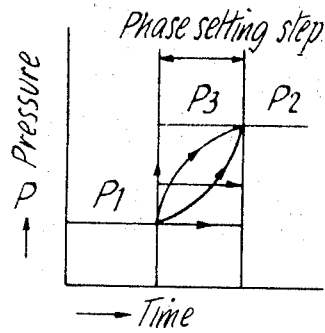

In the embodiment described above, the pressure $P_2$ used in the upsetting step is made larger than that in the heat generating step. However, it should be understood that $P_2$ can be equal to $P_1$. Further, although the pressure $P_3$ used in the phase setting step is made equal to $P_1$, the pressure $P_3$ can be a constant pressure which is not smaller than $P_1$ and not greater than $P_2$, or the pressure $P_3$ can be varied in various ways between $P_1$ and $P_2$, as shown in FIG. 4(a), (b) and (c). By varying the pressure $P_3$ between $P_1$ and $P_2$, it is possible to vary the torque transmitted between the contacting surfaces of the bodies to be welded together. Namely, it is possible to control the rise of rotational speed of the driven shaft 9, whereby the time $T_3$ for the phase setting step can be made shorter (as indicated by the dotted line in FIG. 4(a)), or the rate of relative rotation of the lay shafts 5' and 9' can be detected with more accuracy (as indicated by the dotted line in FIG. 4(b)), with the result that the durability of the teeth of the electromagnetic clutch 8 can be enhanced. In the embodiment described above, the rate of relative rotation of the bodies 7 and 7' is reduced to zero by bringing the rate of rotation of the body 7' close to the rate of rotation $N_1$ of the other body 7 and then the rate of rotation of said bodies 7 and 7' is reduced to a level suitable for performing the trimming. However, it may be possible to set the rate of rotation $N_1$ of the body 7 at a level suitable for trimming and to set the rate of rotation $N_2$ of the other body 7' in the relation of $N_2 > N_1 > 0$, or the rates of rotation of the respective bodies are set in the relation of $N_1 > 0$ and $N_2 > 0$, as shown in FIG. 5, and thereafter the rate of relative rotation of said bodies is progressively reduced to zero to set the relative rotational positions of said bodies.

It should be understood that the trimming operation is not necessarily commenced in the process of deceleration in the upsetting step as in the embodiment described herein, but may be commenced in the process of the rotational position setting step, depending upon an adequate rate of rotation of the driving shaft 5 for the heat generating step (which is determined by the contacting area and the material of the bodies to be welded together).

Figure 6:
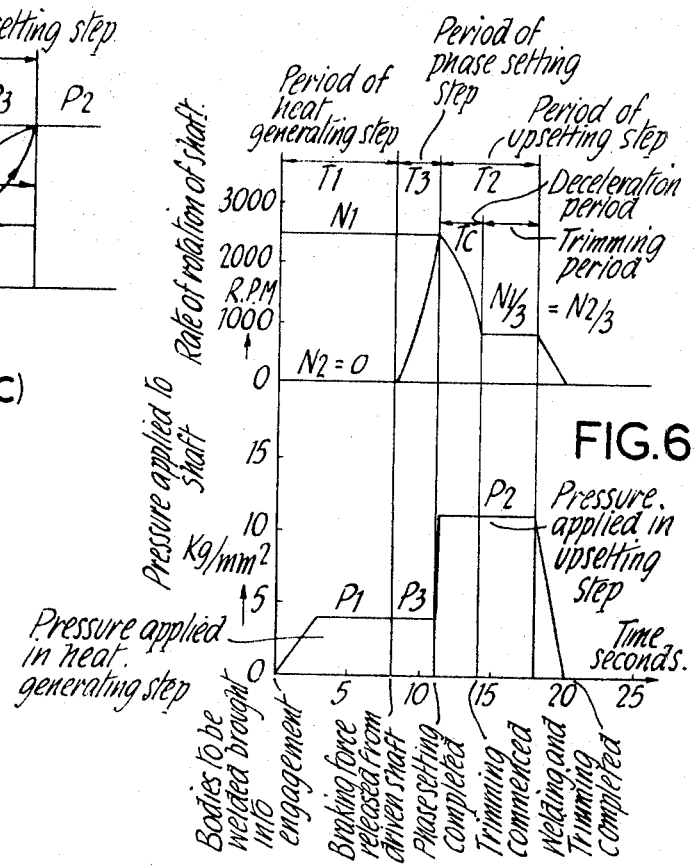
FIG. 6 is a process chart of an experimental example of the invention.

An experimental example of the method of this invention will be described hereunder with reference to the process chart of FIG. 6. The bodies welded together and the welding conditions used in this experimental example are as follows:

Bodies welded together: Diameter : 20 mm
 Material : S430
Welding conditions : $P_1 = 4$ Kg/mm²
 $P_3 = 4$ Kg/mm²
 $P_2 = 11$ Kg/mm²
 $T_1 = 5$ seconds
 $T_3 = 3$ seconds
 $T_c = 3$ seconds
 $T_2 = 7$ seconds
 $N_1(N'_1) = 2,500$ (833) r.p.m.
 $N_2(N'_2) = 0$ (heat generating step) to 2500 (833) r.p.m. (rotational position setting step)
 $N_{1/3}, N_{2/3}(N'_{1/3}, N'_{2/3}) = 833$ (277) r.p.m.

In the experiment, the two bodies were positively and satisfactorily welded together in a predetermined rotational position relation, and the burr formed at the welded portions of the bodies was completely removed.

In the above-described embodiment of the invention, the welding cycle can be shortened and the welding can be performed efficiently as compared with the previously described method known to the Applicants, and moreover a positive weld can be obtained without the welded portions of the bodies become deformed, even when one of the bodies to be welded together is a tubular body. Another advantage is that a burr trimming operation can be carried out concurrently with the rotational position-setting friction welding operation, so that the operation efficiency of the welding operation as a whole can be markedly enhanced and thereby the cost of the welded product can be reduced.

What we claim is:

1. A method of friction welding two rotating bodies in a predetermined relative rotational relation, comprising the steps of positioning the two bodies coaxially, and while positively rotating one of them, pressing the two bodies against each other in the axial direction for bringing the other body to the rotational speed of the one body and generating sufficient heat to weld the two bodies together, sensing the relative rate of rotation of the two bodies and when the relative rate of rotation reaches a predetermined value, and with the bodies still rotating, rotating one of the bodies relative to the other until they reach a predetermined relative rotational position in which they are to be welded, then positively rotating both bodies at the same speed, and continuing said rotation of the bodies while holding them together under pressure for completing the welding from the heat generated during the relative rotation of the bodies.

2. The method of friction welding as claimed in claim 1 which further comprises, during the rotation of the bodies when they are pressed together, trimming any burr formed during the welding of the bodies to each other.

3. A method as claimed in claim 2 in which the rate of relative rotation at which the clutch means is actuated is sufficiently greater than zero that sufficient further relative rotation will take place to ensure the engagement of the clutch means.

4. A method as claimed in claim 2 further comprising, during the rotation of the bodies when they are pressed together, trimming any burr formed during the welding of the bodies together.

5. A method of operating an apparatus for friction welding two rotating bodies in a predetermined relative rotational relation, the apparatus having two rotary members each being adapted to hold one of the bodies coaxially with the other, and the rotary members being movable toward and away from each other, driving members, means coupled to one of the rotary members, two shafts, one positively coupled with one of the rotary members and the other positively coupled with the other rotary member, and a one position clutch means coupled between said lay shafts and having clutch members operable for relative rotation and then engagement in only one relative rotational position of the lay shafts, said method comprising means for positioning them in the desired relative rotational positions and adjusting the clutch means for making the engaged position of the clutch means correspond to the desired relative rotational positions of the bodies, disengaging the clutch means, driving the driving means for rotating the one rotary member while moving the rotary members toward each other to press the bodies against each other so as to rotate the body in the other rotary member and through said other body, rotate the other rotary member for generating sufficient heat to weld the two bodies together, sensing the relative rate of rotation of the two rotary members and when the rate has reached a predetermined value, operating said clutch means, whereby further relative rotational movement of the rotary members and the lay shafts coupled thereto will cause the clutch to couple the lay shafts and hence the rotary members and the bodies carried thereby in the desired relative rotational relation, and continuing to operate the drive means while continuing to urge the rotary members toward each other for completing the welding from the heat generated during the relative rotation of the bodies.

6. An apparatus for friction welding two rotating bodies in a predetermined relative rotational relation, comprising two rotary members each having means for holding one of the bodies to be welded coaxially with the other, means coupled to said rotary members for moving them toward and away from each other, driving means coupled to one of said rotary members, two lay shafts, one positively coupled with one of the rotary members and the other positively coupled with the other rotary member, and a one position clutch means coupled between said lay shafts and having clutch members operable for relative rotation and then engagement in only one relative rotational position of the lay shafts.

7. An apparatus as claimed in claim 6 further comprising rotational speed detecting means coupled to the rotatable elements of said apparatus for sensing the rotational speeds of said rotary members, and rate determining means coupled to said detecting means and to said clutch means for determining the relative rate of rotation of said rotary members and for actuating said clutch means when said relative rate of rotation reaches a predetermined value.

8. Apparatus as claimed in claim 6 which further comprises means for trimming a burr which may be formed during a welding operation.

9. Apparatus as claimed in claim 6 in which each lay shaft is connected to a rotary member by gears and the gear ratio between each lay shaft and rotary member is the same.

10. Apparatus as claimed in claim 6 in which the one position clutch is an electromagnetic clutch.

11. Apparatus as claimed in claim 6 in which the means for rotating one of the said rotary members is a variable speed means.

12. Apparatus as claimed in claim 11 in which the means for rotating one of the said rotary members is a variable pole motor.

* * * * *